(12) United States Patent
Lim

(10) Patent No.: US 6,466,438 B1
(45) Date of Patent: Oct. 15, 2002

(54) GENERIC EXTERNAL PORTABLE COOLING DEVICE FOR COMPUTERS

(76) Inventor: Sui-Lin Lim, Flat 1, 34 Aldershot RD, Guildford, Surrey GU2 8AF (GB)

(*) Notice: Subject to any disclaimer, the term of this patent is extended or adjusted under 35 U.S.C. 154(b) by 0 days.

(21) Appl. No.: 09/550,946

(22) Filed: Apr. 17, 2000

(51) Int. Cl.[7] .................................................. G06F 1/16
(52) U.S. Cl. ........................ 361/687; 361/688; 361/702; 361/703; 361/704; 361/705; 361/707; 248/346; 62/80
(58) Field of Search .................................. 361/687, 688, 361/690, 692, 694, 696, 349; 248/346, 346.07, 917, 918, 924, 442.2, 444, 448, 148, 178, 678; 761/704, 702, 707, 710, 712; 62/80, 151, 259.1; 4/574.1

(56) References Cited

U.S. PATENT DOCUMENTS

| | | | |
|---|---|---|---|
| 5,135,817 A | * 8/1992 | Shimogori et al. | 428/621 |
| 5,470,041 A | * 11/1995 | Cucinotta | 248/349 |
| 5,553,824 A | * 9/1996 | Dutra, Jr. | 248/346.07 |
| 5,606,341 A | * 2/1997 | Aguilera | 345/87 |
| 5,634,351 A | 6/1997 | Larson et sal. | 62/259.2 |
| 5,826,643 A | 10/1998 | Gaylon et al. | 165/80.4 |
| 5,966,286 A | 10/1999 | O'Conner et al. | 361/687 |
| 5,969,939 A | 10/1999 | Moss et al. | 361/686 |
| 5,978,228 A | 11/1999 | Borkar et al. | 361/753 |
| 5,982,615 A | 11/1999 | Song | 361/687 |
| 5,996,354 A | * 12/1999 | Sokolean et al. | 62/80 |
| 6,018,459 A | * 1/2000 | Carlson et al. | 361/704 |
| 6,055,155 A | * 4/2000 | von Gutfeld | 361/687 |
| 6,115,857 A | * 9/2000 | Bidegain | 4/574.1 |
| 6,260,610 B1 | * 7/2001 | Biber et al. | 165/80.3 |

* cited by examiner

*Primary Examiner*—Darren Schuberg
*Assistant Examiner*—Yean-Hsi Chang
(74) *Attorney, Agent, or Firm*—John S. Heyman

(57) ABSTRACT

A device for assisting the cooling of computers, especially laptop computers, provides material having an upper surface distributed over at least two levels, preferably a corrugated surface, whereby it contacts the base of the laptop over only a part of said base, permitting the free passage of air across the support and between the laptop and the support, said support being formed from a material of high thermal conductivity, with a surface adapted for rapid transfer of heat between the material and air passing over said surface.

10 Claims, 14 Drawing Sheets

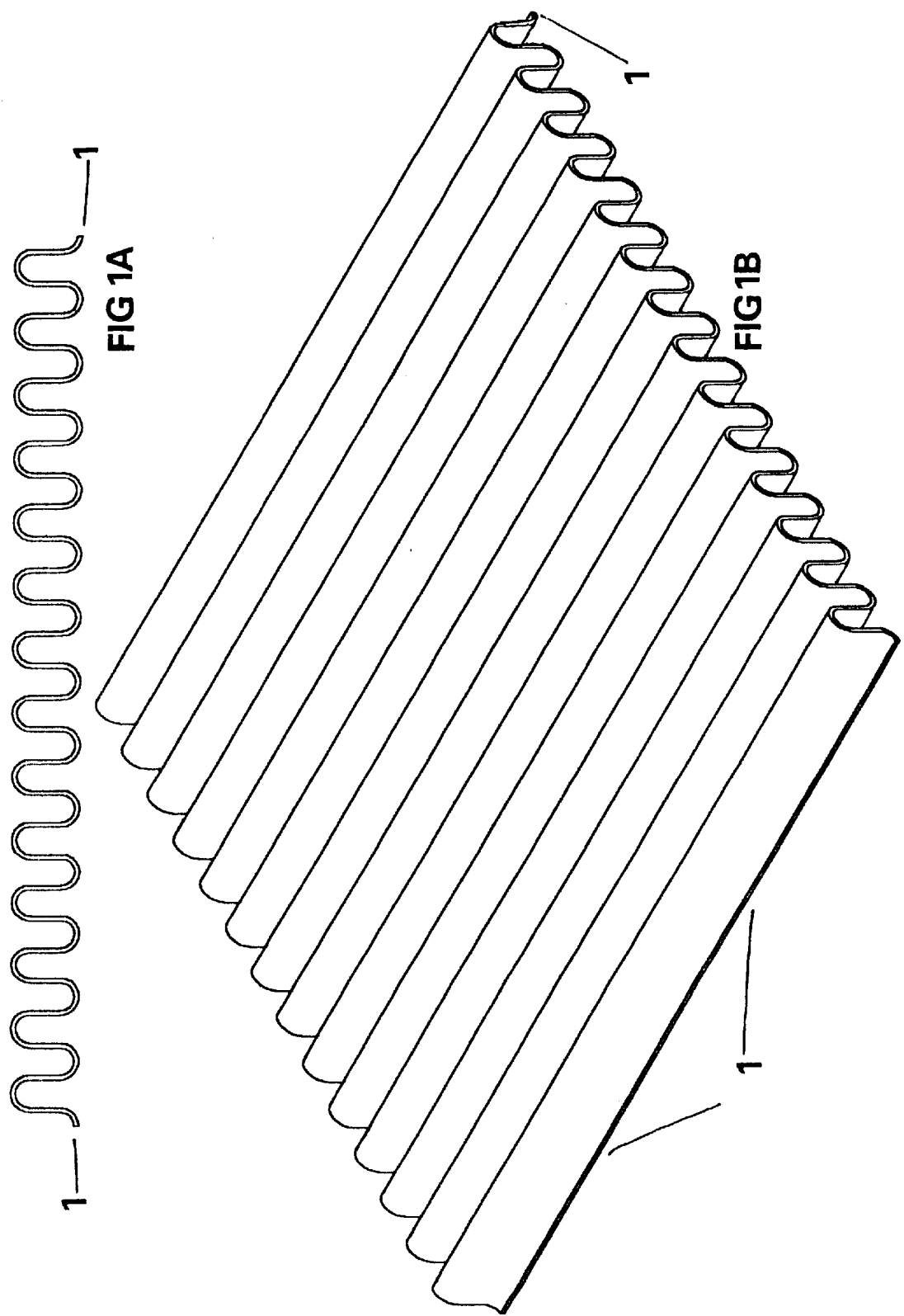

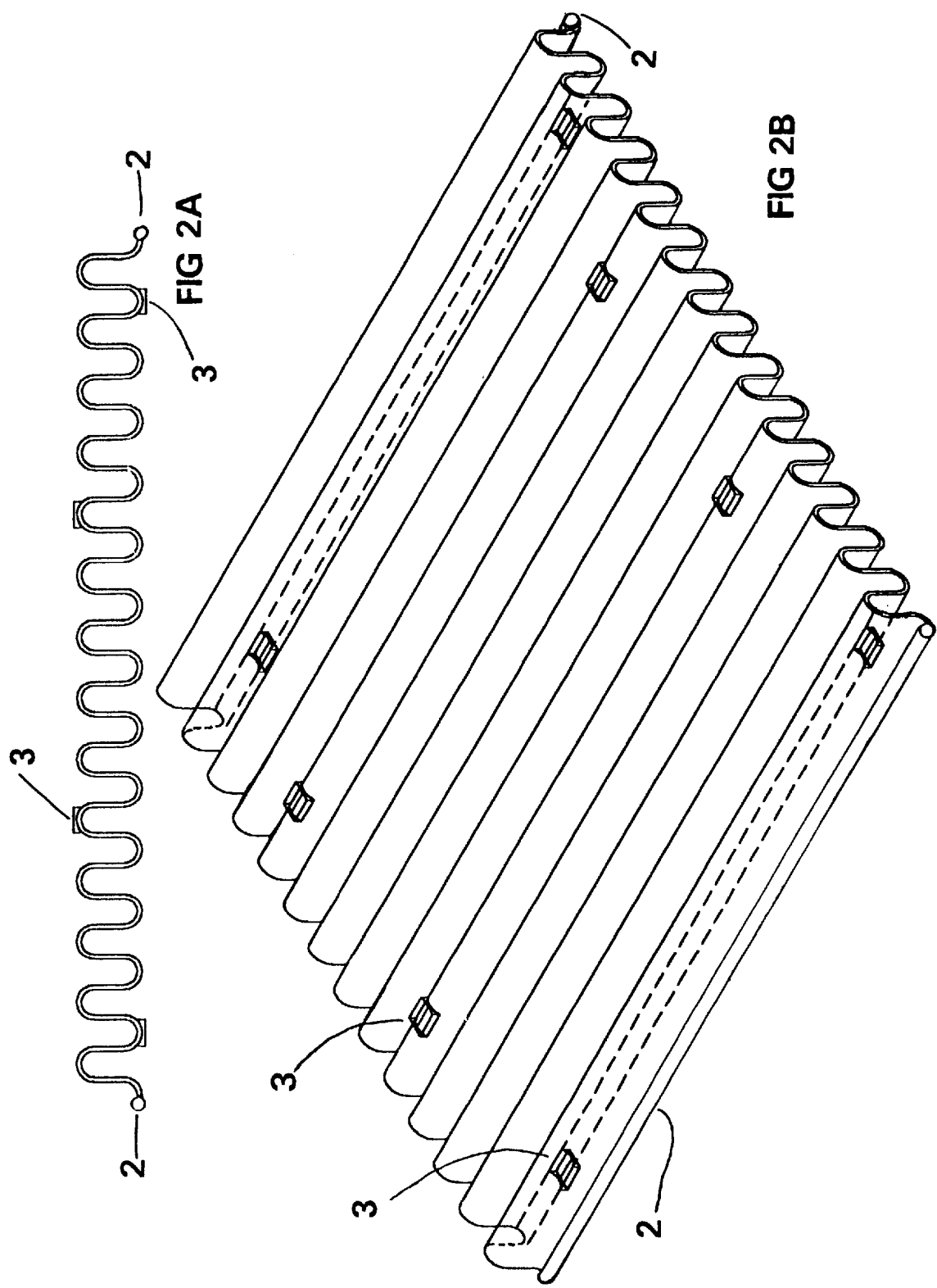

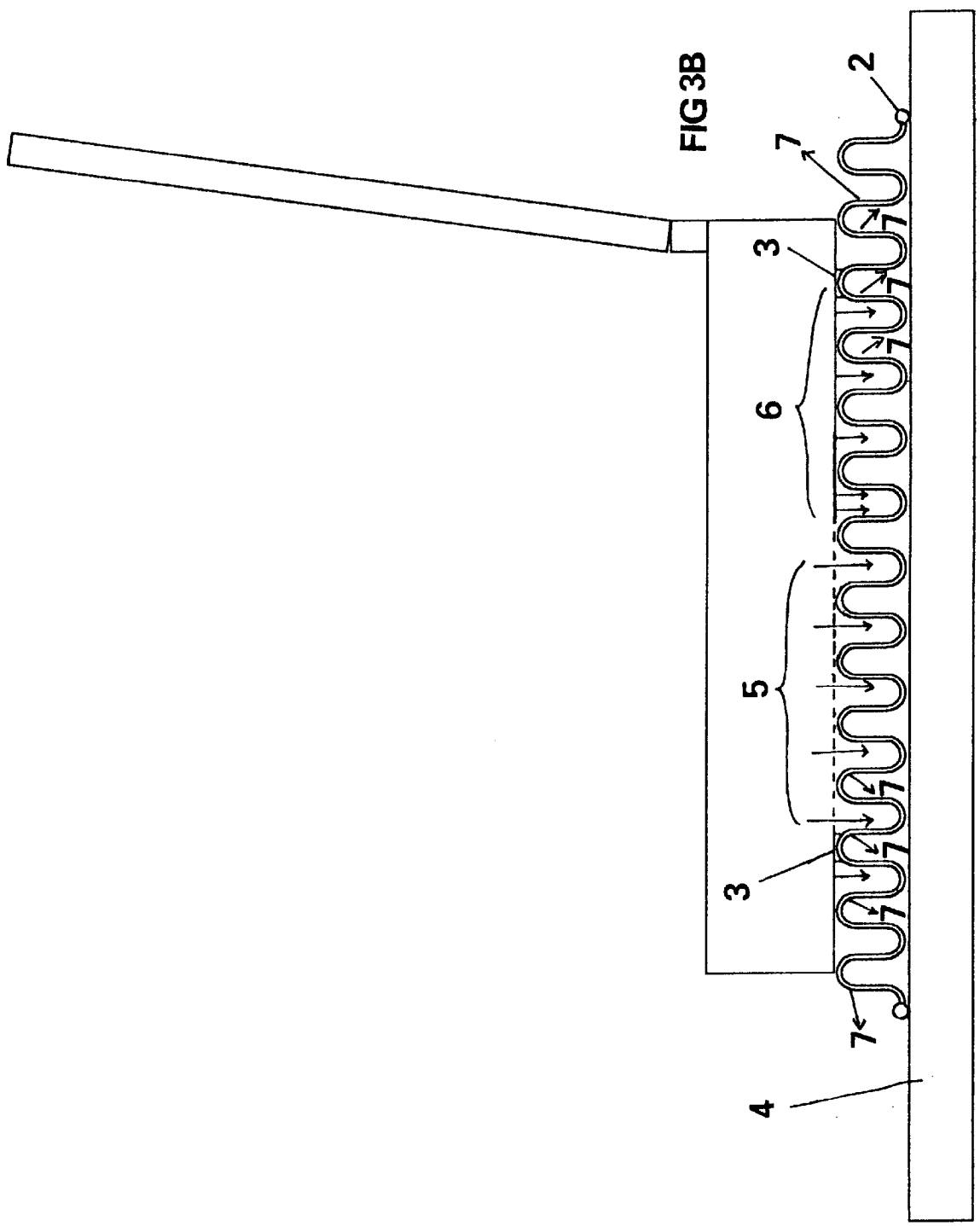

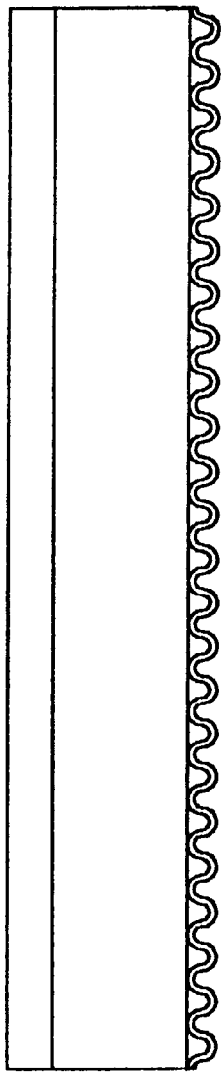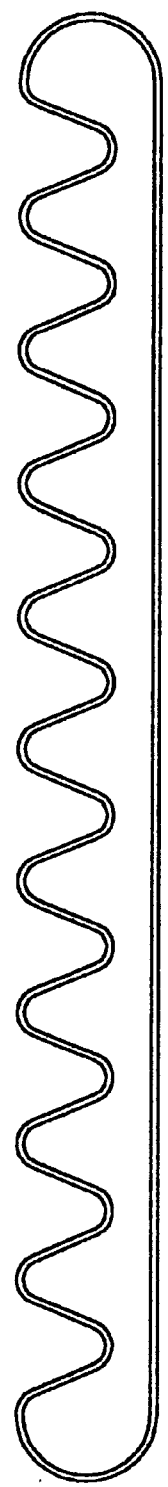

GENERIC EXTERNAL PORTABLE COOLING DEVICE FOR COMPUTERS

BACKGROUND—Field of Invention

This Invention relates to a generic external cooling device for laptop computers, and for cases of computers.

BACKGROUND—Description of Prior Art

Laptop computers contain heat-producing components such as microprocessors, batteries, and DVD/CDROM drives in a small space. When the laptop is in use, these components heat up the air inside the laptop. Some laptop manufacturers accommodate this by providing vents for air exchange on the base of the laptop chassis.

However, laptops are often used on tables/desks, sofas, beds and even floors. These work surfaces are usually made of materials of low thermal conductivity such as wood, plastics, lacquer, cloth or carpet.

When such laptops are in use, the heat generating components continuously heat up the air inside, which flows out of the vents onto insulating surfaces. Therefore transfer of heat from the laptop is hindered.

Furthermore, some laptops have only small vents, or no vents, on the base of the chassis which leads to even less heat loss, so the actual base of the chassis itself heats up.

The base area of the laptop is relatively large with respect to the size of the laptop, so using it on surfaces with high thermal resistivity reduces the possibility of significant heat transfer from the laptop by virtue of surface area.

As heat is continuously produced while the laptop is in use, heat builds up inside the laptop.

Therefore using laptops on surfaces of low thermal conductivity causes the laptop to heat up. This can cause the laptop to overheat, thereby slowing it down and/or causing it to 'crash'. The faster a CPU has to work, the more heat it generates. When a laptop is used at maximum capacity, e.g. working with large sized graphic files or watching DVD multimedia, the continuous production of heat from components can make prolonged use uncomfortable if the laptop is held on a lap.

Consumer demand for mobile computing dictates a trend to produce smaller, sleeker laptops with higher speed CPUs, larger RAMs and built in DVD ROMS. This results in the production of laptops with higher heat generating components in smaller casings. This exacerbates the problem of heat build up in the laptop, as there is less air surrounding components that produce more heat during usage.

There have been several inventions that address the problem of the heat generated within laptops. So far the solutions provided suffer from a number of disadvantages.

U.S. Pat. No. 5,969,939 to Moss, et al., (1999) is designed to cool the laptop computer while it is attached to a docking station, so that a surface of the computer is in engagement with a heat conductive surface. This means that the laptop is only cooled while in use with its docking station, therefore partially reducing the advantages of mobility. A docking station is intended for use on a table and not on a lap, sofa or bed, or while in transit. Furthermore, heat transfer by conduction is only effective if the conductive surfaces are flush in tight contact with each other, to aid thermal conduction from the computer chassis to the conductive surface.

U.S. Pat. No. 5,982,615 to Song (1999) attempts to increase heat loss via air ventilation holes formed on the keyboard. This method not only requires the development of such a keyboard, but also providing more apertures allows more dust to enter the laptop.

U.S. Pat. No. 5,936,836 to Scholder (1999) uses a fan to direct airflow over the heat sink in order to remove heat from the heat sink. The running of this extra fan to induce airflow over the heat sink will draw on battery power.

U.S. Pat. No. 5,978,228 to Borkar, et al., (1999), provides an apparatus to mount a very large scale integration (VSLI) chip, such as the microprocessor, on the chassis of the computer system, in order to dissipate heat from the VSLI chip to the outside through the computer chassis. As described earlier, most work surfaces are made of low conductivity material, and using such a computer on insulting surfaces will reduce the effectiveness of heat dissipated through the computer chassis. A heated chassis may not be comfortable when the laptop is used on a lap.

Several Patents such as U.S. Pat. No. 5,822,187 to Thermal Corp (1998), U.S. Pat. No. 5,910,883 to IBM (1999), U.S. Pat. No. 5,818,693 to Thermal Corp (1998), U.S. Pat. No. 5,966,286 to O'Conner, et al., Patent WO 99/10797 to Intel Corp (US) (1999), use a system of heat pipes to cool the laptop. Other Patents such as DE 4244743 to Toshiba Kawasaki KK (1995), U.S. Pat. No. 5,634,351 to Aavid Lab Inc (1997), U.S. Pat. No. 5,606,341 to NCR Corp (1997) and U.S. Pat. No. 5,826,643 to Gaylon, et al (1998) require the use of liquid coolants within the laptop to aid in heat loss. These solutions require a system of ducts, pipes or bags of flexible film that contain the coolant for evaporation and condensation. therefore entailing specific incorporation inside the laptop, and reducing housing space in the laptop, which can otherwise be used for components. These methods also add to the weight of the laptop, and possible increase in size of the chassis.

One commercially-available cooling device is a stand for laptops comprising a pair of mutually rotatable sheets of plastics material. The upper sheet has a pair of protrusions near one edge so that the laptop may be raised at a slight slant, leaving a small space between. Some cooling Is achieved, but this Is only temporary and, on extended use, the temperature within the laptop will exhibit a considerable increase.

OBJECTS

Among the objects of the present invention are:

(a) To provide heat transfer from the laptop without requiring it to be attached to an immobile structure which in part defeats the purpose of mobile computing.

(b) To provide heat transfer from the laptop without the need for more apertures, thus decreasing the exposure of internal components to dust.

(c) To provide heat transfer from the laptop without the need to draw power from the mains or battery.

(d) To improve heat transfer from the laptop via the chassis, and allow a heated chassis to be comfortably used on a lap.

(e) To provide heat transfer from the laptop, without adding more apparatus or components to the limited space available within the casing, or adding extra weight to the laptop itself.

Further objects and advantages are to provide a laptop cooling device, which can be easily and conveniently, used without internal alterations to the laptop itself.

One embodiment of the invention provides external cooling equipment for cooling laptop computers which comprises a support for raising a laptop above a working surface for the laptop, said support having an upper surface distributed over at least two levels whereby it contacts the base of the laptop over only a part of said base, permitting the free passage of air across the support and between the laptop and the support, said support being formed from a material of high thermal conductivity, with a surface adapted for rapid transfer of heat between the material and air passing over said surface.

Another embodiment of the invention provides external cooling equipment for cooling computer cases which comprises a material adapted to fit round the casing of a computer unit, contacting the casing over only a part thereof, permitting the free passage of air across the computer casing and between the casing and the equipment, said equipment being formed from a material of high thermal conductivity, with a surface adapted for rapid transfer of heat between the material and air passing over said surface.

As the invention aids the dissipation of the heat built up in the laptop without the need specific design and integration within the computer, it is relatively less expensive to produce. Due to its generic nature, it is suitable for use with existing laptops without internal modifications such that any laptop owner can use it.

DRAWING FIGURES

In the drawings, closely related figures have the same number but different alphabetic suffixes.

FIG. 1A shows the preferred embodiment (side view)

FIG. 1B shows the preferred embodiment (isometric view)

FIG. 2A shows the preferred embodiment with safety padding and anti slip attachments (side view)

FIG. 2B shows the preferred embodiment with safety padding and anti slip attachments (isometric view)

FIG. 3B illustrates the transfer of radiant heat (side view)

FIGS. 8A to 8C illustrates variations in the size of undulations

Figure 3A:
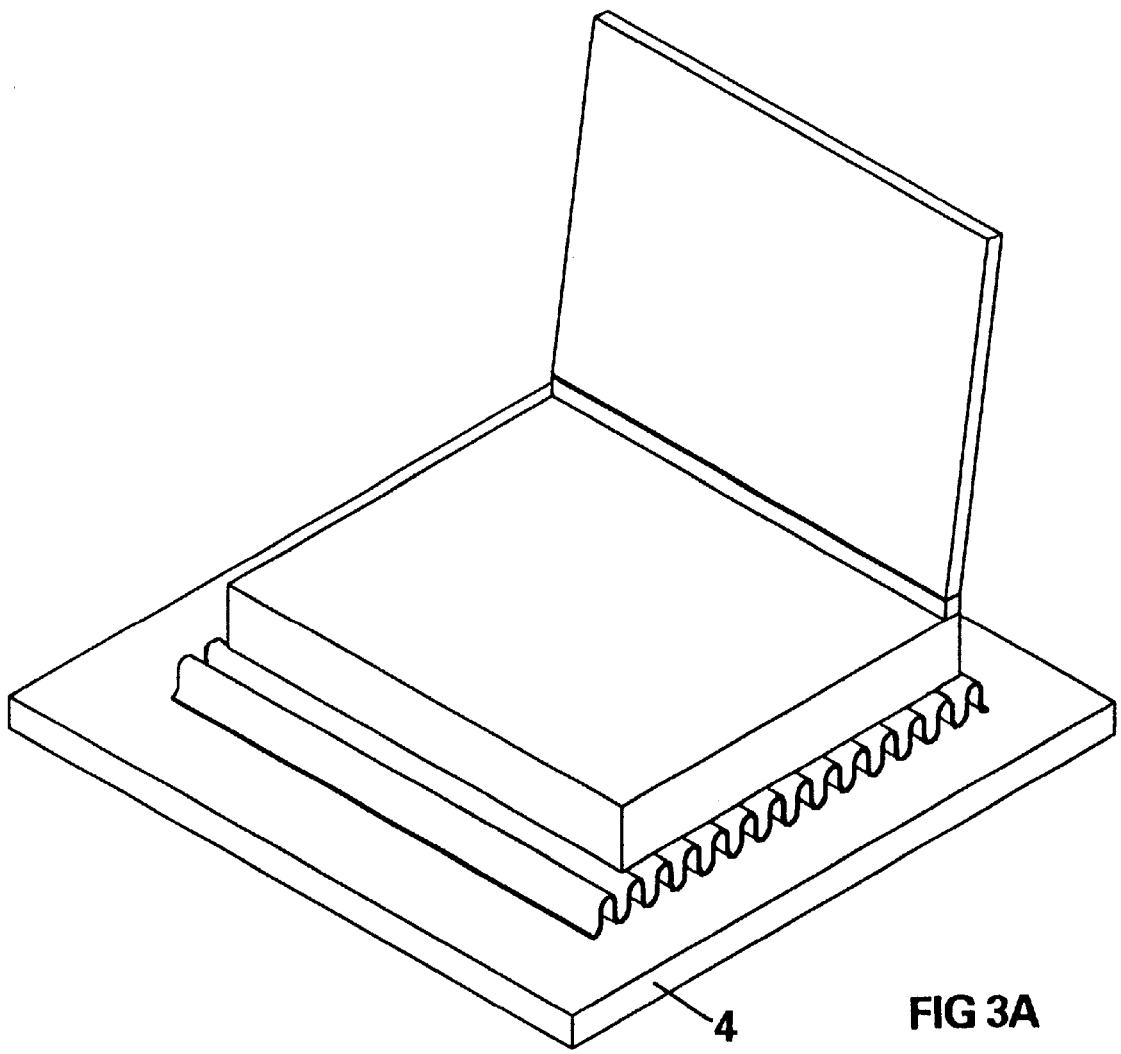
FIG. 3A shows the preferred embodiment in use (isometric view)

The following reference numerals are used in the accompanying Drawings.

1 outer edges
2 padding
3 anti slip studs
4 work surface
5 hot airflow
6 thermal radiation from laptop chassis
7 thermal radiation from cooling device
8 airflow
9 soft surface
10 swivel base
11 perforations
12 clamp
13 hinge
14 access to base of laptop
15 tubes providing an alternative embodiment of the inventions
16 a sheet forming a further alternative embodiment
17 upwardly directed protrusions
18 downwardly directed protrusions A preferred embodiment of the present invention is illustrated in FIGS. 1A (side view) and 1B (isometric view). The device comprises a corrugated sheet of material having a uniform cross section, as shown in FIG. 1A. The device is made of material with a high thermal conductivity and a high strength to weight ratio such as an aluminum alloy.

The preferred embodiment has a durable anti-corrosion finish, which is matt in texture and black in color. This finish can be achieved by an anodizing process, in which the corrugated sheet of aluminum alloy is used as the anode an electrolysis process resulting in the formation of an even coat of an oxide layer over the surface. The color depends on the type of oxide used in the electrolysis.

The device may be manufactured in a range of sizes, adapted to the dimensions of the computer being used. A device which can conveniently be used with most commercially-available laptop computers will have overall dimensions of roughly 250 mm×300 mm and a rectangular shape. The thickness of the sheet may typically be from 0.5 mm to 2.0 mm.

As shown in FIGS. 2A (side view) and 2B (isometric view), the outer edges 2 including the corners are covered with padding, to avoid snagging and the risk of personal injury. The padding can be made of material such as rubber or plastics foam, so that when in contact with the work surface, it provides increased friction and adds to anti-slip protection as well. Both upper and lower surfaces of the corrugated sheet can have anti-slip material attached to them, to provide friction between the work surface and the laptop. The anti-slip material can be in the form of rubber studs 3 as shown in FIGS. 2a and 2B.

This prevents both the laptop and the cooling device being knocked off the work surface by accident.

Figure 3C:
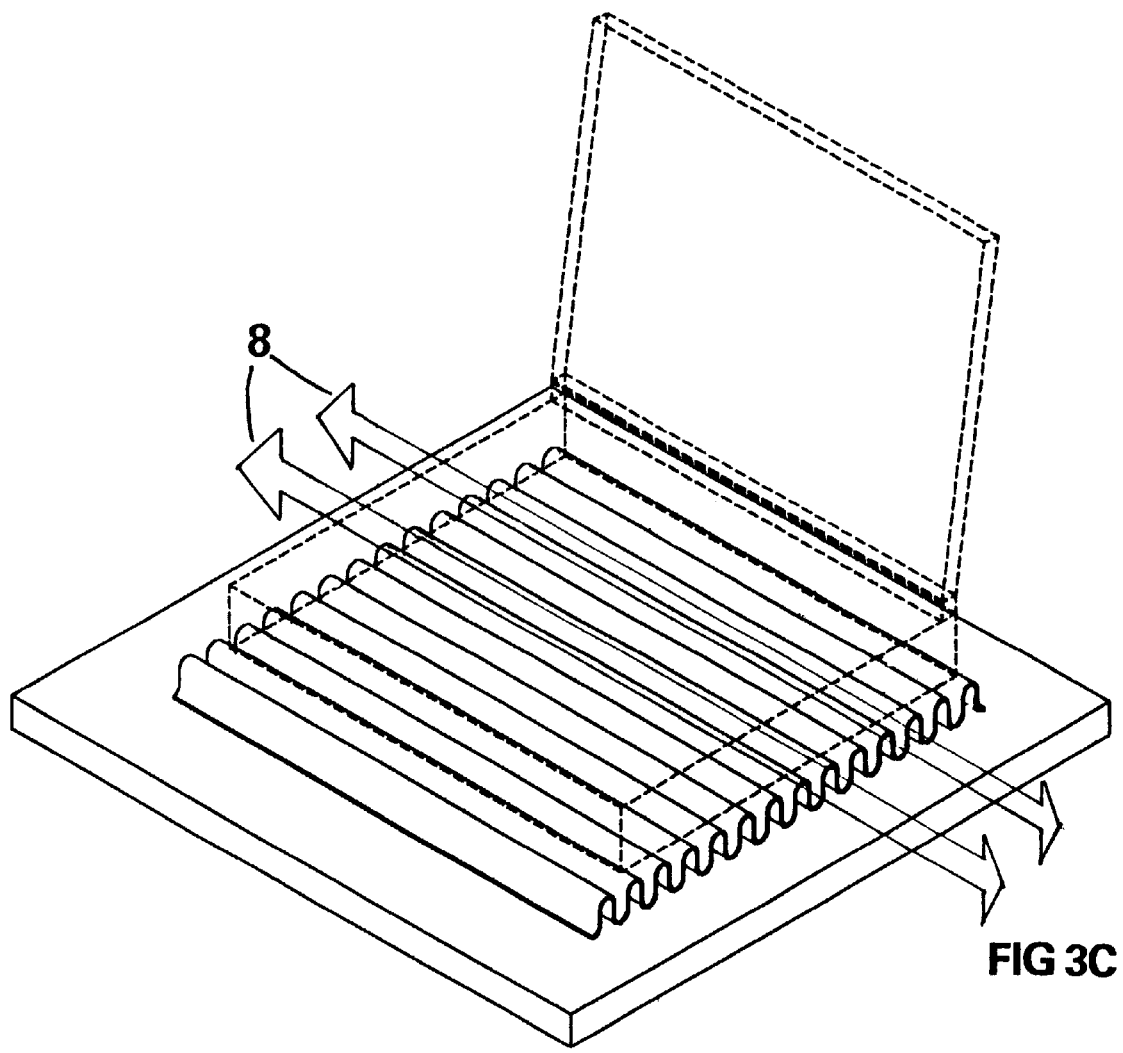
FIG. 3C illustrates airflow channels

Operation of a preferred embodiment of the invention is illustrated in FIGS. 3A to 3C of the accompanying Drawings.

Put the cooling device completely on work surface 4, center the laptop on top of it as in FIG. 3 and turn on the laptop.

As the laptop is used, internal components generate heat inside the laptop, not all of which escapes through vents. The heat builds up and this makes the laptop a hotter body in relation to the cooling device. Therefore heat is transferred from the laptop to the cooling device. The cooling device heats up, becoming hotter than the environment and in turn transfers heat to the environment.

The matt black finish of the device makes its surfaces provide efficient heat transfer by thermal radiation so it cools the laptop by absorbing radiant heat from the laptop and emitting it to the environment.

The corrugated shape provides extra surface area for the absorption and emission of radiant heat. It also provides a series of open-ended channels formed by the corrugations to allow unobstructed airflow 8 from end to end, encouraging heat exchange as illustrated in FIG. 3C (isometric view). While the laptop sits on the corrugated surface, contact between laptop and device is reduced, to minimize blockage of any air vents. The corrugated shape also lends structural strength to maintain its shape under the weight of the laptop and counteracting the downward stress produce from working on it.

Thus, the device reduces the problem of heat build up within the laptop because it acts as an intermediate work surface that dissipates radiant heat away from the laptop thereby cooling it, irrespective of the thermal properties of the actual work surface used.

Further embodiments of the invention are described in FIGS. 4A, 4B, 5, 6A, 6B, 7A, 7B of the accompanying Drawings.

Figure 4A:
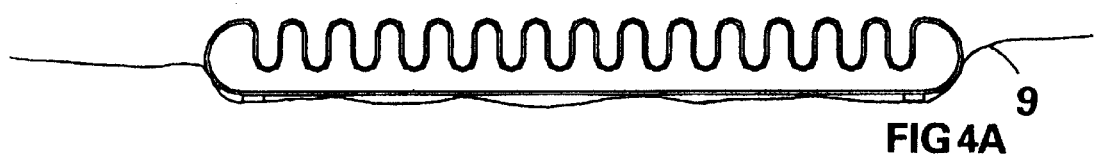
FIG. 4A shows preferred embodiment incorporated into a tray used on a soft surface (side view)
Figure 4B:
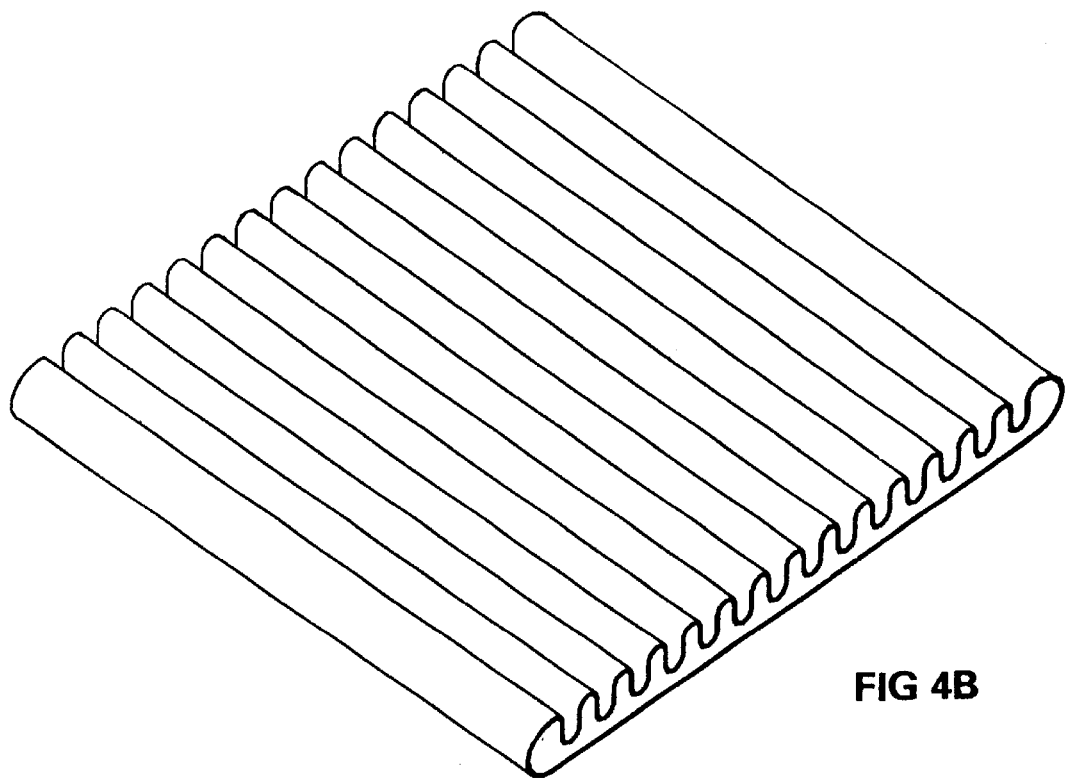
FIG. 4B shows preferred embodiment incorporated into a tray (isometric view)
Figure 5:
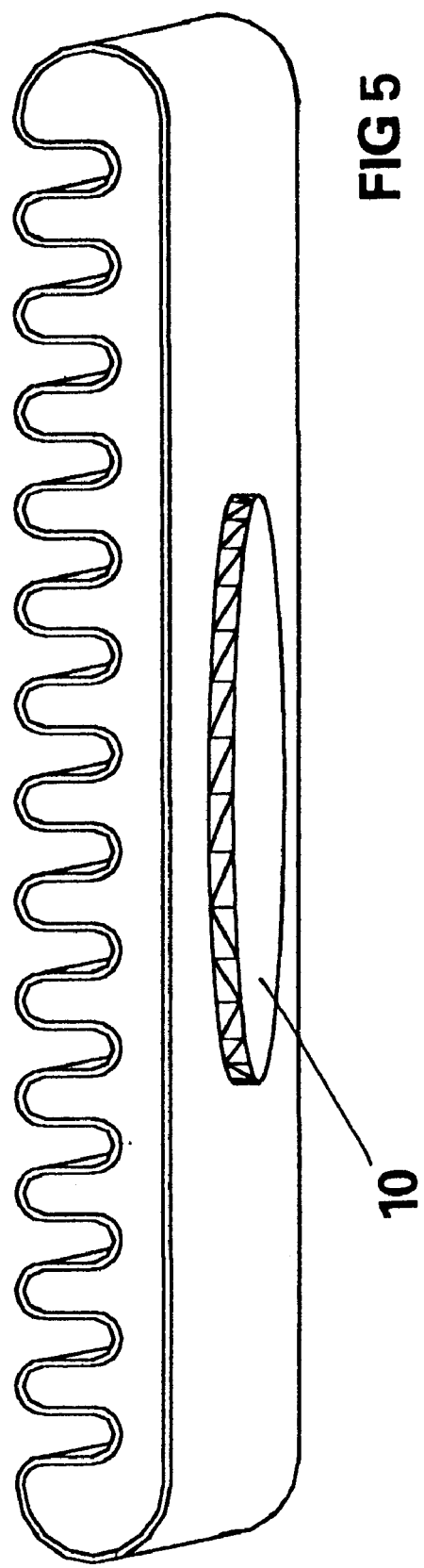
FIG. 5 shows the dissipater Incorporated into a tray with an anti slip swivel tray (isometric view from below)

In each instance the preferred embodiment employs the basic corrugated form, which can be incorporated into a variety of applications in laptop accessories. FIGS. 4A (side view) and 4B (isometric view) show the basic form incorporated into a tray for more comfortable use on a lap or soft surfaces 9 such as a sofa, bed or lap. FIG. 5 shows the basic form incorporated into a tray with an anti slip swivel base 10 for ease of use on hard work surfaces such as a desk.

Figure 6A:
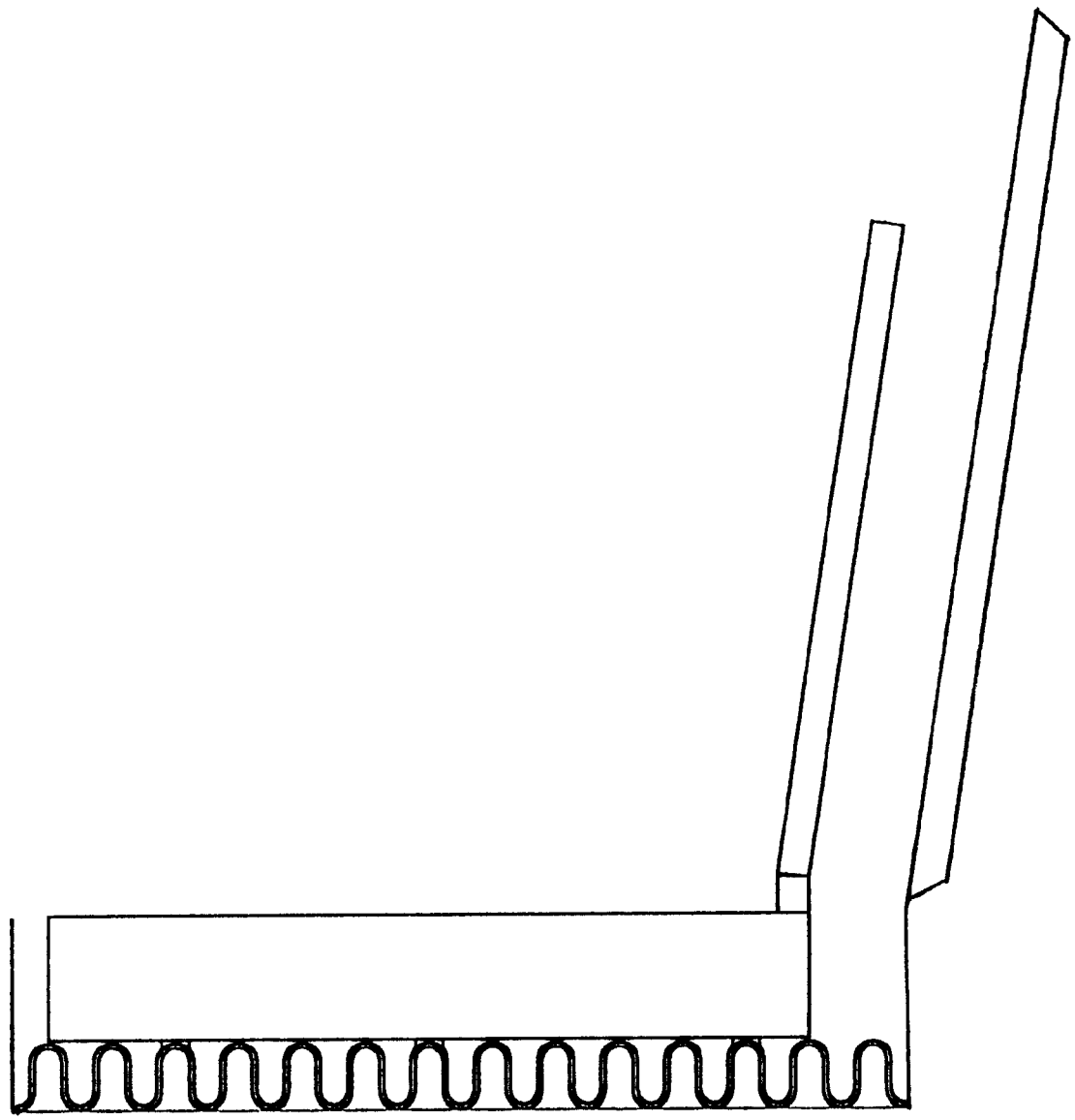
FIG. 6a shows the dissipater incorporated into a laptop carrying case (Side view)
Figure 6B:
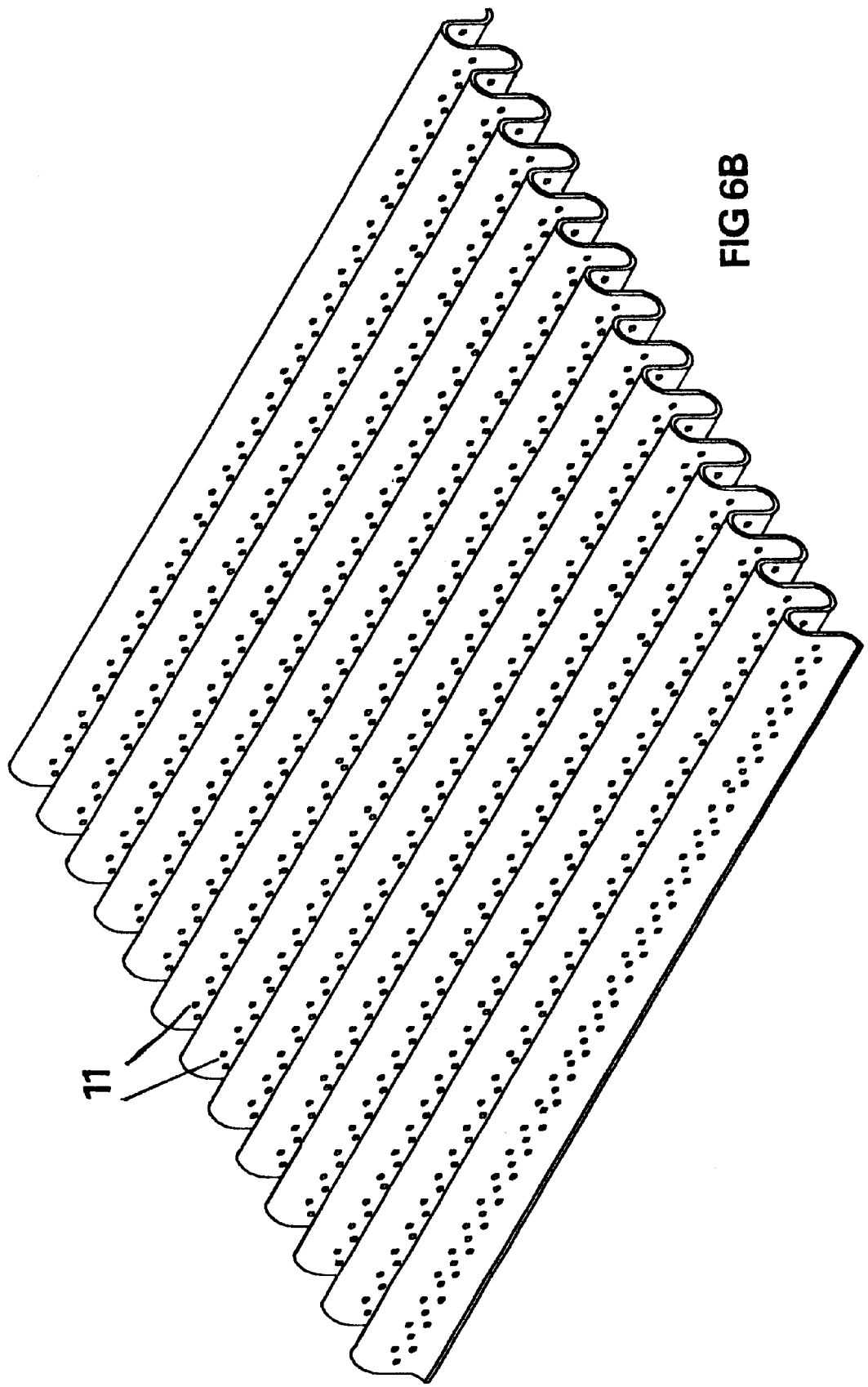
FIG. 6b shows the dissipater with perforations (Isometric View)

FIG. 6A (side view) shows the device incorporated into a laptop-carrying case for ease of use while in transit. Perforations 11 as shown in FIG. 6B (isometric view) may be provided and are specially recommended when the open-ended channels are blocked by the side of the carrying case.

Figure 7A:
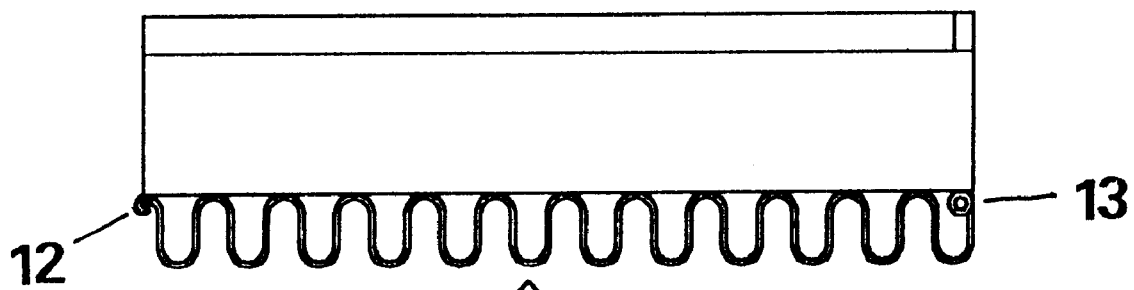
FIG. 7A shows the dissipater attached to the base of the chassis
Figure 7B:
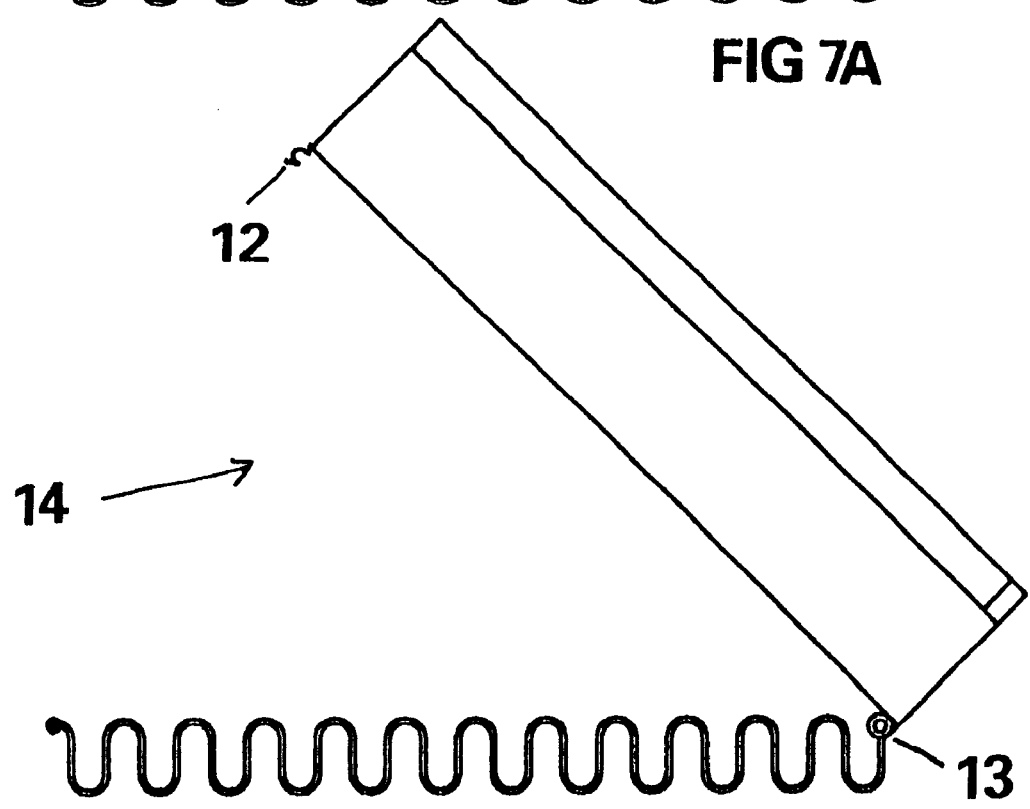
FIG. 7B shows the attached dissipater in an open position
Figure 9:
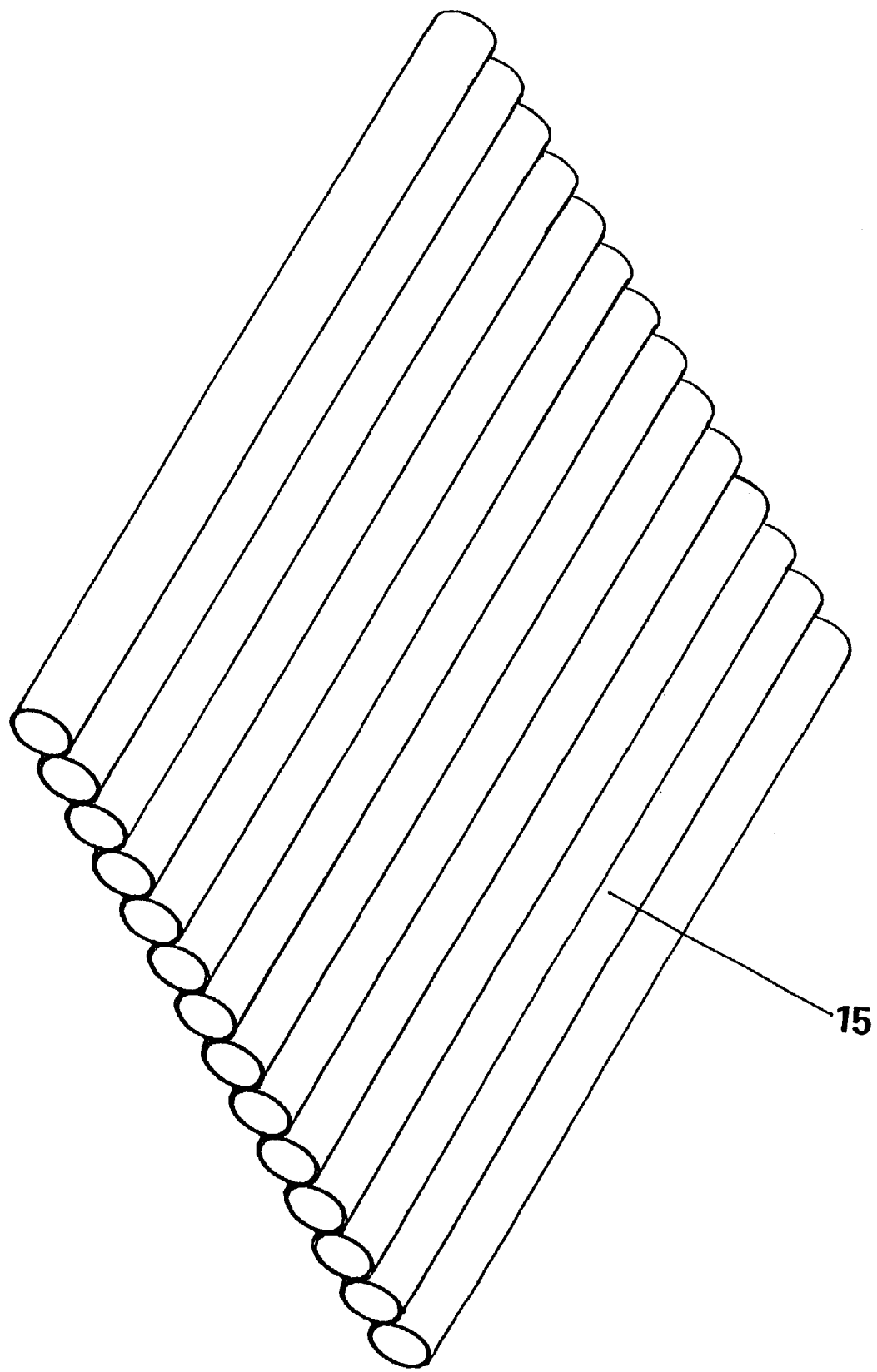
FIGS. 9, 10A and 10B represent alternative embodiments of the invention.

Laptop manufacturers can attach the basic device to the base of an external chassis as shown in FIGS. 7A and 7B, with attachment such as releasable clamps 12 and external hinging 13, so that the device may be easily moved for access 14 to internal components for upgrading or repair.

Advantages

From the above description of the preferred embodiment, and the additional and alternative embodiments, a number of advantages of the present invention become evident:

(a) The simplicity of design and manufacture results in relatively lower manufacturing costs.

(b) The protective coating makes the cooling more durable especially when it is in transit and resistant to corrosion.

(c) The anti slip attachments reduces the risk of the cooling tray being knocked of the work surface.

(d) The anti slip attachments reduces the risk of the laptop being knocked of the cooling tray.

(e) The matt Black Coating ensures that the surface is most efficient for heat transfer by thermal radiation.

(f) The corrugated shape provides an increased surface area for thermal radiation.

(g) The corrugated shape ensures that contact with the laptop is such that blocking of any air vents is minimized.

(h) As it is designed to cool a laptop from below, the shape of the cooling tray does not obstruct any communication ports can and is therefore generic in use, requiring no alternation by the user so the operation of the cooling device is simple.

(i) The device can be easily incorporated into a variety of laptop accessories as illustrated in FIG. 6 to FIG. 10.

(j) Manufacturers can incorporate it into the base of the chassis for external integration by making relatively small modifications. This requires no modifications of internal components.

Alternative embodiments are illustrated in FIGS. 8A to 8C.

The frequency and size of the corrugations will depend on whether the basic form is used on its own, or incorporated into various applications as described above. For example, when the device is used as an external attachment by manufacturers, (as shown in FIGS. 7A and FIG. 7B), the height of the undulations may be smaller so as not to increase the bulk of the laptop as illustrated in FIG. 8a. The frequency of the corrugations can be decreased when the device is incorporated into a work tray to make it easier to clean as shown in FIG. 8B (side view). Wider undulations may also be used when a second layer is formed as shown in FIG. 8C (side view) to provide an extra surface leading to further radiant heat transfer.

Although a corrugated form for the device according to the invention is preferred, alternative forms may also be employed. In the embodiment shown in FIG. 9, the device may be forward from an array of tubes 15 in the parallel axes.

Figures 10A, 10B:
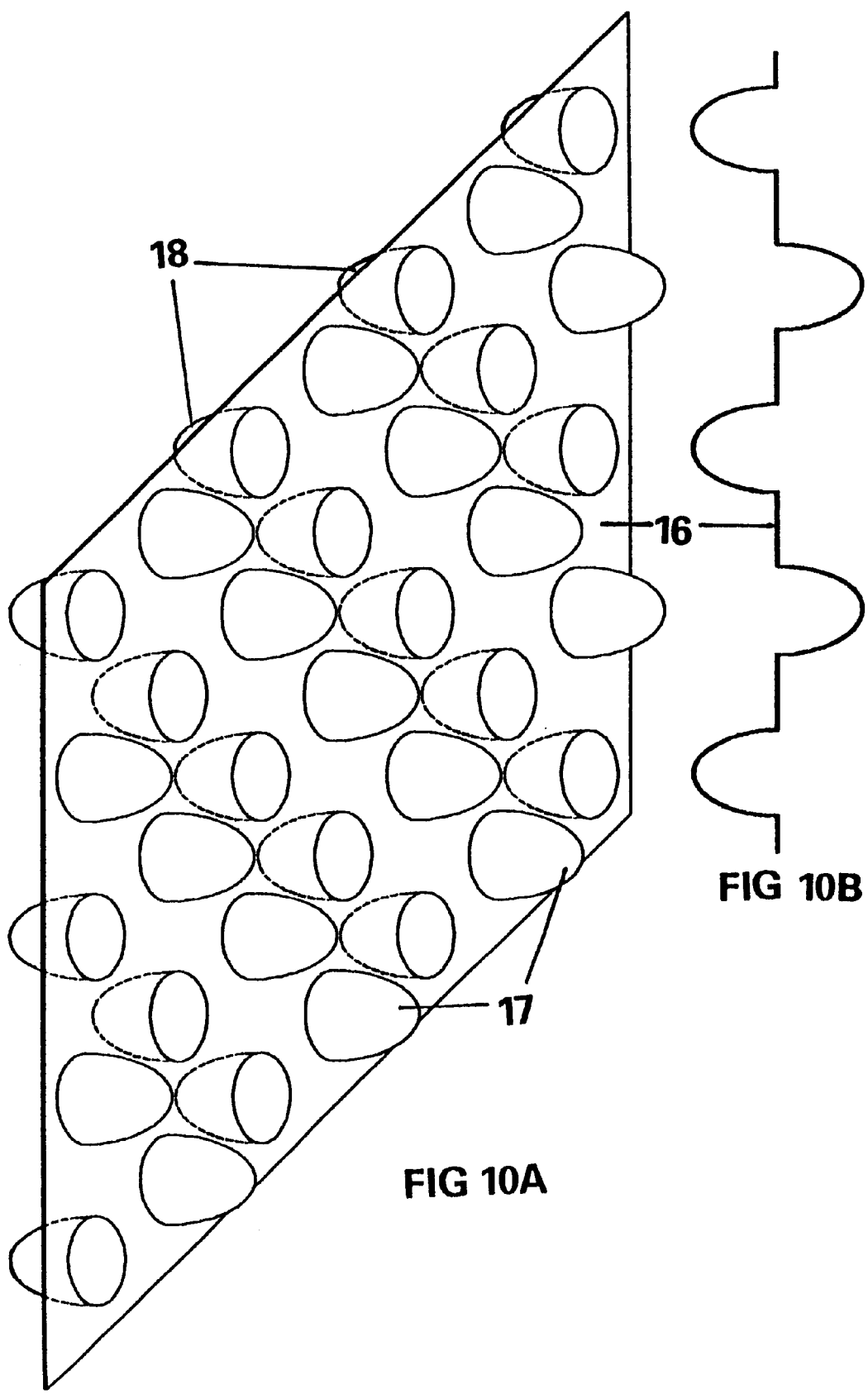

In the embodiment shown in isometric view in FIG. 10A and in section in FIG. 10B, the device may be formed from a planar sheet 16 with upwardly and downwardly-directed protrusions (17, 18).

Figure 11:
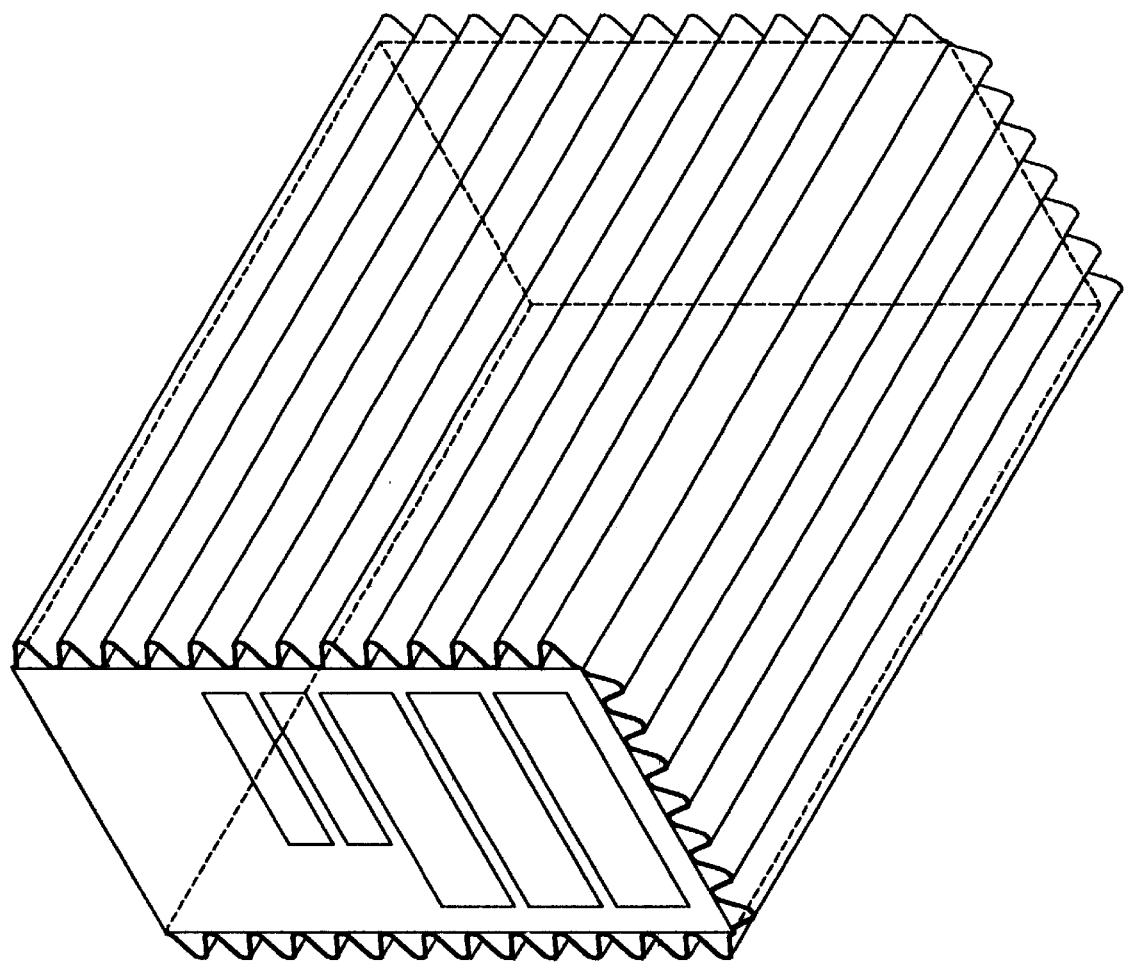
FIG. 11 represents an additional embodiment of the invention, as applied to a desktop computer or server.

The use of a device according to the invention need not be restricted to laptop computers. As illustrated in FIG. 11, it may be applied to the cases for PCs, or the servers of small business networks. Here the device may completely or partially surround the casing.

In all these embodiments, perforations and anti-slip fittings may be provided, as with the corrugated embodiment.

Accordingly the reader will see that the cooling device according to the invention is easy to use, and is suitable for any laptop. Its light and portable attributes make it a convenient way to cool a laptop. In addition it is simple for manufacturers to add on to the external chassis of their laptops without the need to alter or add to the internal components of the laptop thereby reducing costs.

Furthermore the device has additional advantages in that:

Its basic form can be incorporated into a variety of applications in laptop accessories, which will then serve to cool the laptop while the laptop is in use.

It allows for lower manufacturing costs due to its simple and generic design.

It allows for durability as its protective coating makes it resistant to corrosion.

It provides a safe work surface for laptops because of the anti slip attachments and padding.

It provides comfortable prolonged use on a lap.

Although the description above contains many specificities, these should not be construed as limiting the scope of the invention but as merely proving illustrations of some of the presently preferred embodiments of this invention. Thus the scope of the invention should be determined by the appended claims and their legal equivalents, rather than by the examples given.

What is claimed is:

1. An autonomous, portable cooling device for use with a laptop computer having a base comprising:

a single, autonomous sheet of material in external communication with said base of said laptop computer; said sheet of material being bent sinuously so as to form a plurality of spaced, recurring maximum and minimum surface points; said plurality of maximum surface points being disposed across and in direct contact with said base, said maximum surface points in direct contact with said base of said laptop computer minimally contacting said base so as to avoid blocking air vents in said base of said laptop computer and structurally independent thereto, while said minimum surface points and all areas of said single sheet between said maximum and minimum surface points being exposed to an ambient air environment; said sheet being formed from a material of high thermal conductivity so as to provide rapid heat transfer; and said sheet further having a thermal radiant heat enhanced protective coating added to make it efficient for thermal radiant heat transfer as well as more durable for portability and resistant to corrosion;

whereby the free passage of air flowing across said sheet of material when in contact with said base provides cooling for said laptop computer.

2. The autonomous, portable cooling device as in claim 1 wherein said bent sheet of material is in the form of a corrugated sheet.

3. The autonomous, portable cooling device as in claim 1 wherein said plurality of maximum and minimum surface points on said sinuous sheet are a plurality of protrusions each having a parabolic cross section.

4. The autonomous, portable cooling device as in claim 1 wherein said sheet of material includes perforations substantially over its entire area.

5. The autonomous, portable cooling device of claim 1 further including a second, basically flat sheet parallel to and spaced below said sinuously bent sheet, said second sheet having opposed curved edges formed to connect and be unitary with opposed edges of said bent sheet.

6. The autonomous, portable cooling device of claim 5 further including an anti-slip swivel base attached to a bottom of said second sheet for providing ease of use on a hard work surface for said laptop computer.

7. The autonomous, portable cooling device as in claim 1 wherein said added protective coating is of a color and has properties having a high heat absorbing and emitting quality for efficient radiant heat transfer.

8. The autonomous, portable cooling device of claim 7 wherein said color and properties of said coating are matt black.

9. The autonomous, portable cooling device of claim 1 wherein said sheet further includes anti-slip means attached to selected said maximum surface points for providing increased friction between said sheet and said base of said laptop computer.

10. The autonomous, portable cooling device as in claim 1 or 9 wherein said sheet further includes anti-slip means attached to selected said minimum surface points for providing increased friction between said sheet and a work surface.

* * * * *